(12) United States Patent
Birk et al.

(10) Patent No.: US 9,208,299 B2
(45) Date of Patent: Dec. 8, 2015

(54) SECURE USER AUTHENTICATION WITH IMPROVED ONE-TIME-PASSCODE VERIFICATION

(71) Applicant: Intel Corporation, Santa Clara, CA (US)

(72) Inventors: Eran Birk, Haifa (IL); Omer Ben-Shalom, Rishon (IL)

(73) Assignee: Intel Corporation, Santa Clara, CA (US)

( * ) Notice: Subject to any disclaimer, the term of this patent is extended or adjusted under 35 U.S.C. 154(b) by 101 days.

(21) Appl. No.: 13/995,540

(22) PCT Filed: Mar. 9, 2013

(86) PCT No.: PCT/US2013/030071
§ 371 (c)(1),
(2) Date: Jun. 19, 2013

(87) PCT Pub. No.: WO2014/142779
PCT Pub. Date: Sep. 18, 2014

(65) Prior Publication Data
US 2014/0259116 A1  Sep. 11, 2014

(51) Int. Cl.
*G06F 21/00* (2013.01)
*G06F 21/31* (2013.01)
*G06F 21/33* (2013.01)

(52) U.S. Cl.
CPC ............... *G06F 21/31* (2013.01); *G06F 21/33* (2013.01)

(58) Field of Classification Search
USPC ........................................... 726/4–10
See application file for complete search history.

(56) References Cited

U.S. PATENT DOCUMENTS

| 2010/0199086 | A1 | 8/2010 | Kuang et al. |
| 2010/0323716 | A1 | 12/2010 | Jaffri |
| 2011/0179477 | A1* | 7/2011 | Starnes et al. ............ 726/9 |
| 2011/0321134 | A1* | 12/2011 | Kotani ............ 726/4 |

OTHER PUBLICATIONS

International Search Report and Written Opinion received for PCT Patent Application No. PCT/US2013/030071, mailed on May 14, 2013, 9 Pages.

* cited by examiner

*Primary Examiner* — Ghazal Shehni
(74) *Attorney, Agent, or Firm* — Grossman, Tucker, Perreault & Pfleger, PLLC

(57) ABSTRACT

Generally, this disclosure provides systems, devices, methods and computer readable media for secure user authentication with improved OTP verification. The device may include an attribute collection module configured to collect attributes associated with the device; a client trust module configured to identify a user of the device, associate a user ID with the user and transmit the user ID and the collected attributes to a trust broker system; the client trust module further configured to receive a device ID from the trust broker system, the device ID associated with a pairing of the user ID and the attributes; and a client OTP generation module configured to generate an OTP and further configured to transmit the OTP and the device ID to an authentication server.

26 Claims, 6 Drawing Sheets

SECURE USER AUTHENTICATION WITH IMPROVED ONE-TIME-PASSCODE VERIFICATION

FIELD

The present disclosure relates to secure user authentication, and more particularly, to secure user authentication with improved one-time-passcode (OTP) verification.

BACKGROUND

It is often necessary to authenticate or verify the identity of a user of a device before allowing that user to access data or services that may be confidential, proprietary or fee based, for example. Some systems require the user to provide a password, passcode or personal identification number (PIN) to gain access, but these items may be stolen or otherwise compromised and users typically find it difficult to remember or manage passwords. This is particularly true for so-called "strong" passwords (e.g., of increased length and more random combinations of characters), which may be more difficult to compromise.

Some systems use one-time-passcodes (OTPs) for improve authentication security. This technique generates a different (e.g., one-time) passcode for each authentication event based on a security seed or token (typically provided to the user in an earlier provisioning operation) in combination with a user password/passcode/PIN. Because the generated passcode may be a "strong" passcode that changes with each use, the passcode may be more difficult to anticipate or steal. This approach is still vulnerable, however, unless a more cumbersome hardware based token is employed, because the identity of the device generating the OTP is unknown and therefore an attacker could use malware to export the OTP seed to another device. Thus, the possibility exists that the security seed may be stolen and/or transferred to another unauthorized or malicious device or that the OTP may be generated on an intended first device but used by a second unauthorized device.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

Although the following Detailed Description will proceed with reference being made to illustrative embodiments, many alternatives, modifications, and variations thereof will be apparent to those skilled in the art.

DETAILED DESCRIPTION

Generally, this disclosure provides systems, devices, methods and computer readable media for secure user authentication with improved one-time-passcode (OTP) verification for a session between a client device and a server. A mechanism is provided for an authentication server to verify both the identity of the user (user ID) and the client device (device ID) to which that user is paired for the session. A client trust module or agent, installed on the client device, may be configured to activate the device, pair the user to the device and collect attributes from the device. The attributes may include, for example, the serial number and international mobile equipment identification (IMEI) of the device as well as location information, a timestamp and any other information related to the security posture of the device. The trust client may provide this information (e.g., user ID and attributes) to a trust broker.

The trust broker, for example a trusted server, may be configured to create and maintain records of client devices, the records including the current user ID and device attributes. The trust broker may create a device ID to associate or index the device to its corresponding record and provide this device ID back to the client device.

The client device may also include an OTP generation module configured to generate an OTP based on a token or seed and to transmit that generated OTP, along with the token and a user PIN, to the authentication server for authentication of a session. The client device may also transmit the device ID, which was provided by the trust broker, to the authentication server so that the authentications server can verify the device ID with the trust broker, thus preventing an unauthorized device from compromising the OTP verification process.

Figure 1:
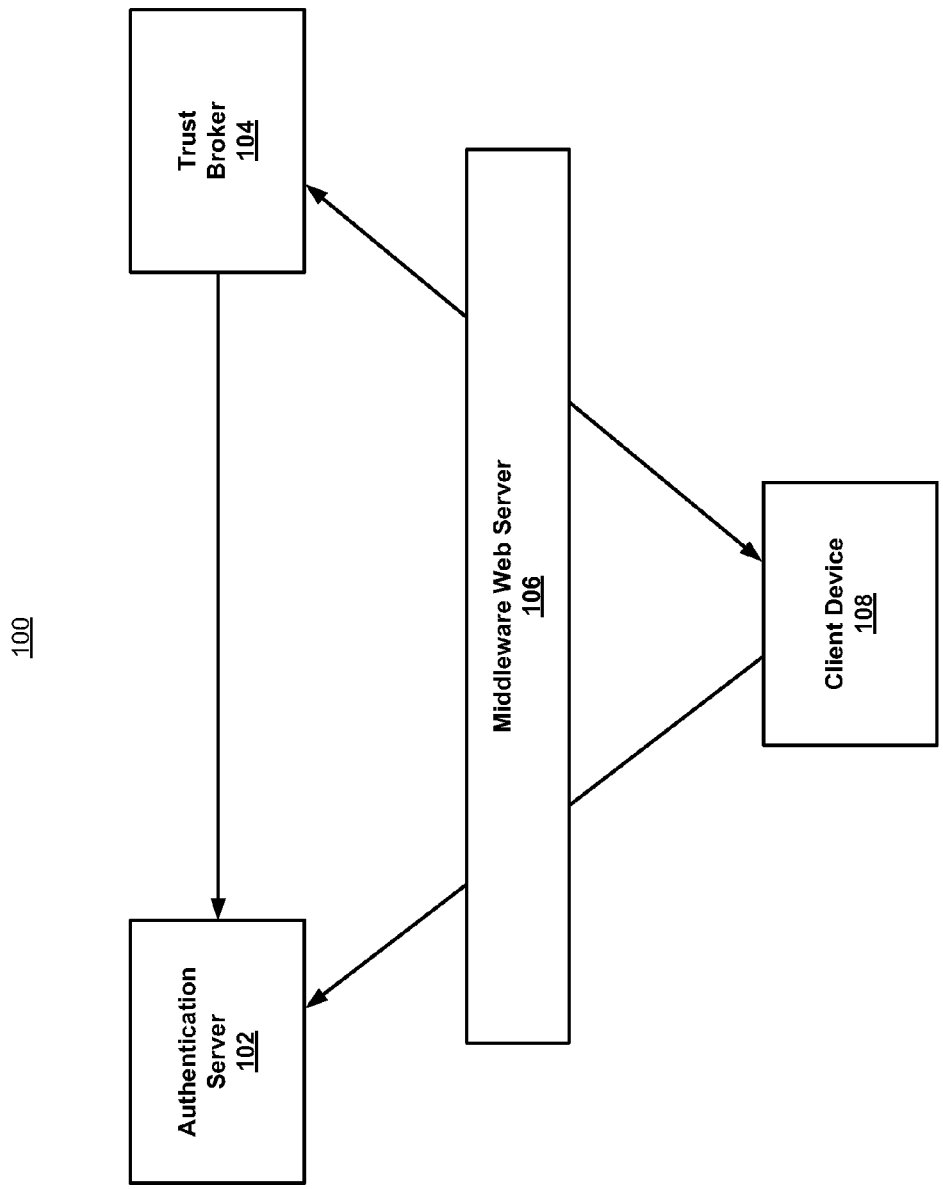
FIG. 1 illustrates a top level system diagram of one exemplary embodiment consistent with the present disclosure.

FIG. 1 illustrates a top level system diagram 100 of one exemplary embodiment consistent with the present disclosure. A client device 108 is shown to communicate with an authentication server 102 and a trust broker 104. In some embodiments, the communications to and from the client device 108 may pass through a middleware web server 106 or other proxy-type server.

The authentication server 102 may be configured to authenticate a session with the client device 108, for example to verify the identity of a user of the device (and an associated trust level) before allowing that user to access data or services that may be confidential, proprietary, fee based or otherwise restricted. The authentication process may be based on an OTP, a token ID, a PIN and a device ID provided by the client device, as will be explained in greater detail below.

The trust broker 104 may be configured to receive and store pairings of user IDs and device attributes from client devices 108 and to create device IDs associated with these pairings. The device IDs may be provided to the authentication server 102 based on a calculated trust level for the device so that the authentication server 102 can verify the identity of the device in response to a subsequent authentication request from that device, as will be explained in greater detail below.

Figure 2:
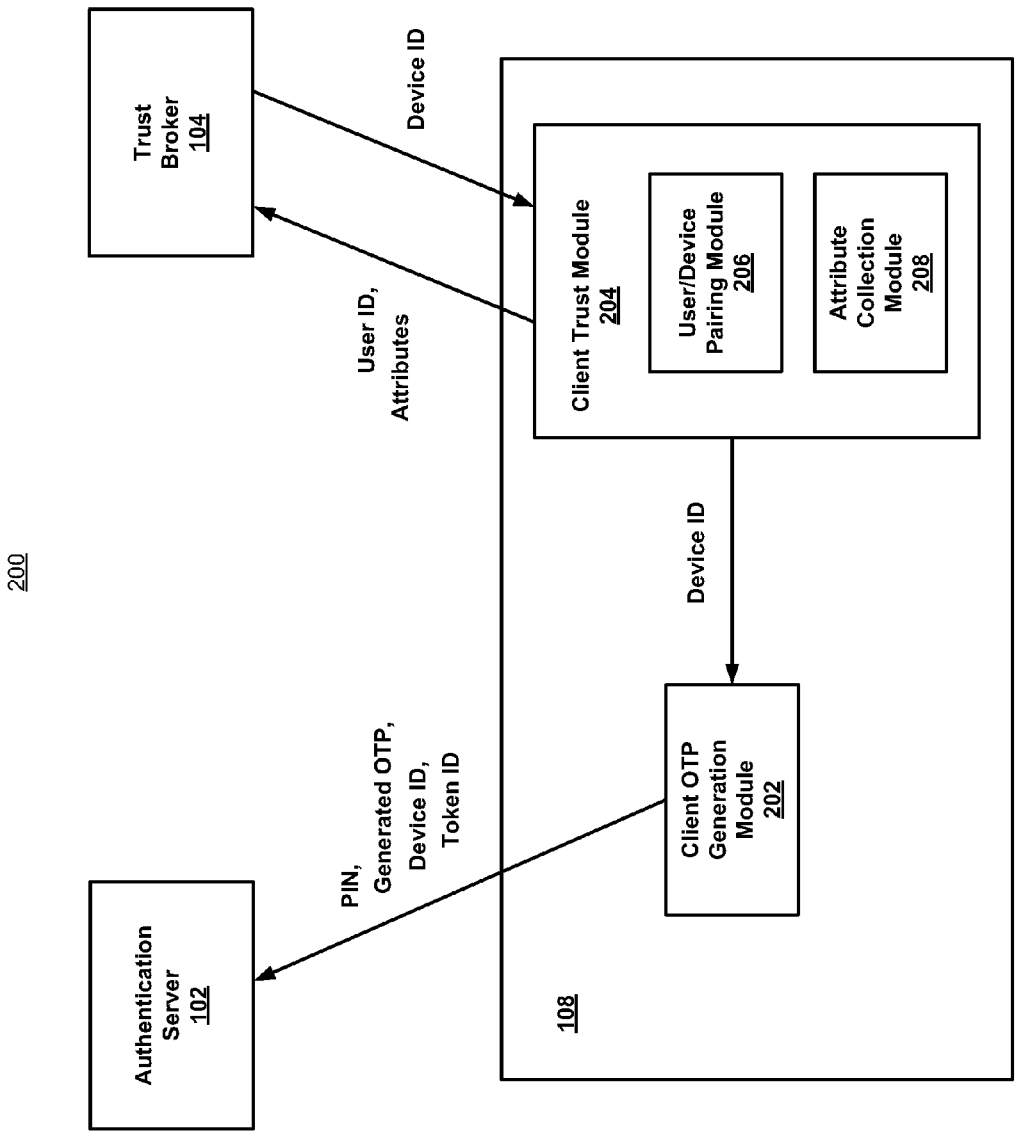
FIG. 2 illustrates a block diagram of one exemplary embodiment consistent with the present disclosure.

FIG. 2 illustrates a block diagram 200 of one exemplary embodiment consistent with the present disclosure. Details of the client device 108 are shown, where the device may be any type of wired or wireless device or platform including, for example, a smartphone, laptop, tablet, computer or other suitable device capable of transmitting or receiving data content over a network. The client device 108 is shown to include a client OTP generation module 202 and a client trust module 204. The client trust module 204 is further shown to include a user/device pairing module 206 and an attribute collection module 208.

The user/device pairing module 206 may be configured to pair a user, designated for example by a user ID, with the device. In some embodiments, this may be performed while activating the device although, in other embodiments, it may also be possible for the device to change users while the device is activated. The user ID may be established through a log in process, for example to gain access to a computer or laptop or to unlock a mobile device or by any other suitable method.

Attribute collection module 208 may be configured to collect attributes associated with the device 108. These attributes may include the device serial number, IMEI or other suitable information that may identify the device. The attributes may also include information about the security posture of the device, such as, for example, whether it is an enterprise device or a personal device, whether it has been jail-broken (or rooted), and/or whether any other security measures are in place. The term "jail-break" refers to the removal of limitations on a device to permit root access to the operating system (OS) which may allow for circumvention of rules and restrictions imposed by the OS or device provider.

The attributes may also include the location of the device along with the time and date. This information may be useful to distinguish the device from another unauthorized device in a different location that may be trying to compromise the authentication process. Location information may be obtained by any suitable technique including, for example, global positioning system (GPS) receivers and/or mobile communication base station transmissions.

The client trust module 204 may transmit the user/device pairing information (e.g., the user ID and collected device attributes) to the trust broker system 104, the operation of which will be described in greater detail below. In turn, the trust broker system 104 may generate a device ID associated with that user/device pairing and provide this device ID back to the client device 108 for subsequent use by the client device in an authentication request with the authentication server 102.

The client OTP generation module 202 may be configured to generate a one-time-passcode (OTP) based on a token ID (e.g., a security seed). The token ID may typically be provided to the client device during an earlier provisioning operation, for example when the user signs up for the service or at other suitable times. During each subsequent authentication request by the client device 108, the client OTP generation module 202 generates a new or updated OTP and transmits that OTP, along with the token ID, to the authentication server 102. The client device 108 also transmits the device ID to the authentication server for use in verifying that the combination of user and device is a trusted combination, as will be explained in greater detail below. In some embodiments, as an additional security measure, a PIN may be entered by the user of the device which may also be transmitted to the authentication server 102 to aid in verifying the user's identity.

In some embodiments, one or more of the modules 202, 204, 206, 208 may be software agents that are downloaded to the client device 108 from the trust broker 104, or another server associated with the managing enterprise, for example, as part of a system provisioning process.

Figure 3:
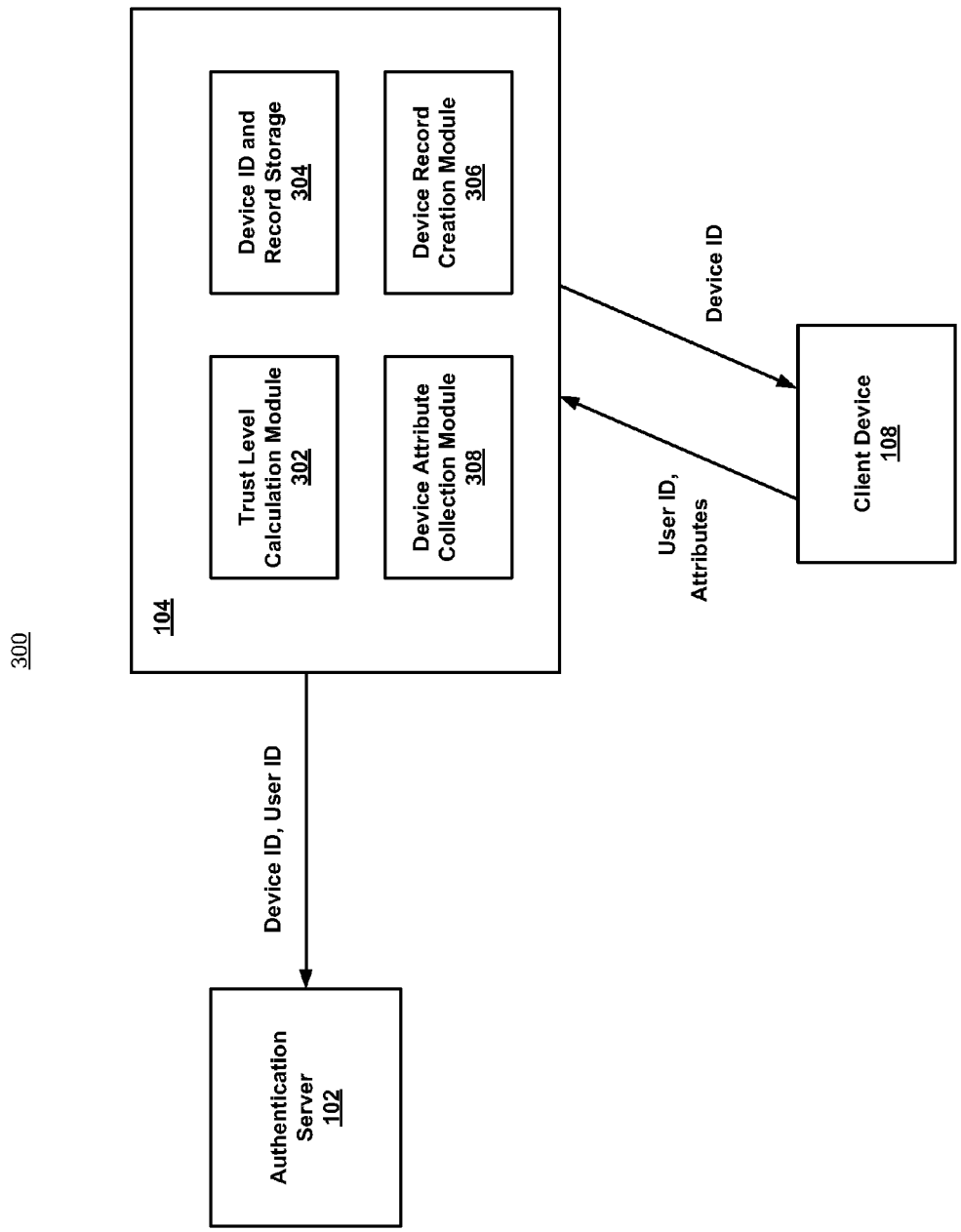
FIG. 3 illustrates a block diagram of another exemplary embodiment consistent with the present disclosure.

FIG. 3 illustrates a block diagram 300 of another exemplary embodiment consistent with the present disclosure. The trust broker 104 is shown to include a device attribute collection module 308, a device record creation module 306, a device ID and record storage module 304 and a trust level calculation module 302. The device attribute collection module 308 may be configured to receive one or more attributes from the client device along with a user ID. The combination of device attributes and user ID may be used to create a pairing of user and device. The device record creation module may be configured to create a record that includes the user ID and device attributes. These records may be created for any number of combinations of users and client devices. A device ID is created and associated with (e.g., to index or uniquely reference) each of the records that are stored 304 on the trust broker 104. The device ID is provided (e.g., transmitted back) to the client device 108 for subsequent use during a session authentication process with the authentication server 102.

The trust level calculation module 302 may be configured to determine a trust level to be associated with a device ID. This trust level may be based on any number of suitable factors, stored in the device record or otherwise obtained, including attributes such as the security posture of the device and the device location, and/or other information known about the user that is associated with the user ID.

The trust broker 104 may provide to the authentication server 102, for example in response to a request, a device ID and/or user ID. The provision of this information to the authentication server 102 may be based on the calculated trust level associated with the device ID and may be used by the authentication server to verify the validity of a request from the client device 108 and the user of that client device.

Figure 4:
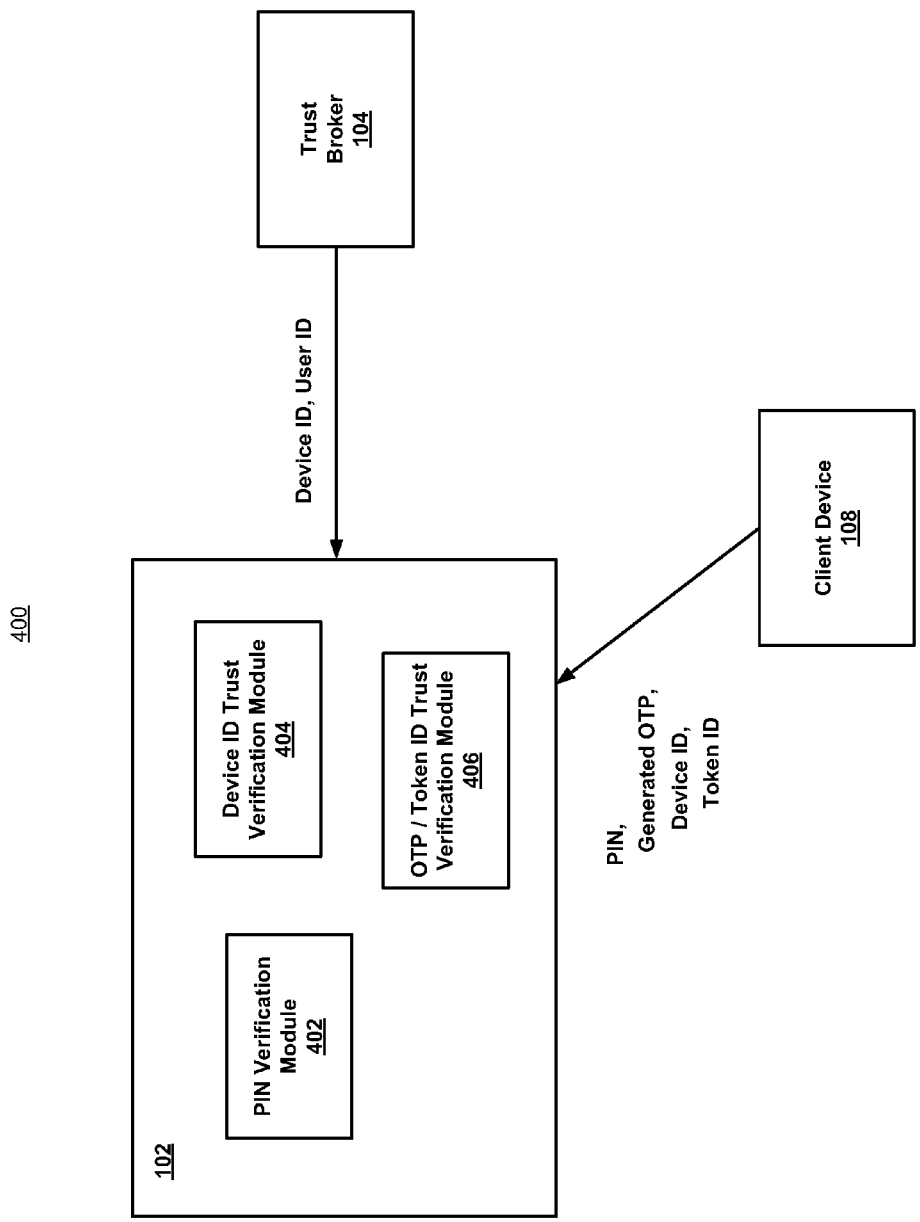
FIG. 4 illustrates a block diagram of another exemplary embodiment consistent with the present disclosure.

FIG. 4 illustrates a block diagram 400 of another exemplary embodiment consistent with the present disclosure. The authentication server 102 is shown to include a PIN verification module 402, a device ID trust verification module 404, and an OTP/Token ID verification module 406. The authentication server 102 may receive a PIN, an OTP, a Token ID and a Device ID from the client device 108 as part of an authentication request, for example to establish a session involving data access or provision of services from an enterprise. The PIN verification module 402 and OTP/Token ID verification module 406 may be configured to validate the identity of the user of the client device 108 by checking the PIN against a known valid PIN and by verifying the generation of the OTP based on the token ID.

Device ID trust verification module 404 may be configured to check the device ID received from the client device with the trust broker 104 to verify that there is a valid and recent trust calculation associated with that device client 108 that is claiming to have generated the OTP. This process increases security by tying the identity of the device on which the OTP is generated with the session established between the device and the authentication server.

Figure 5:
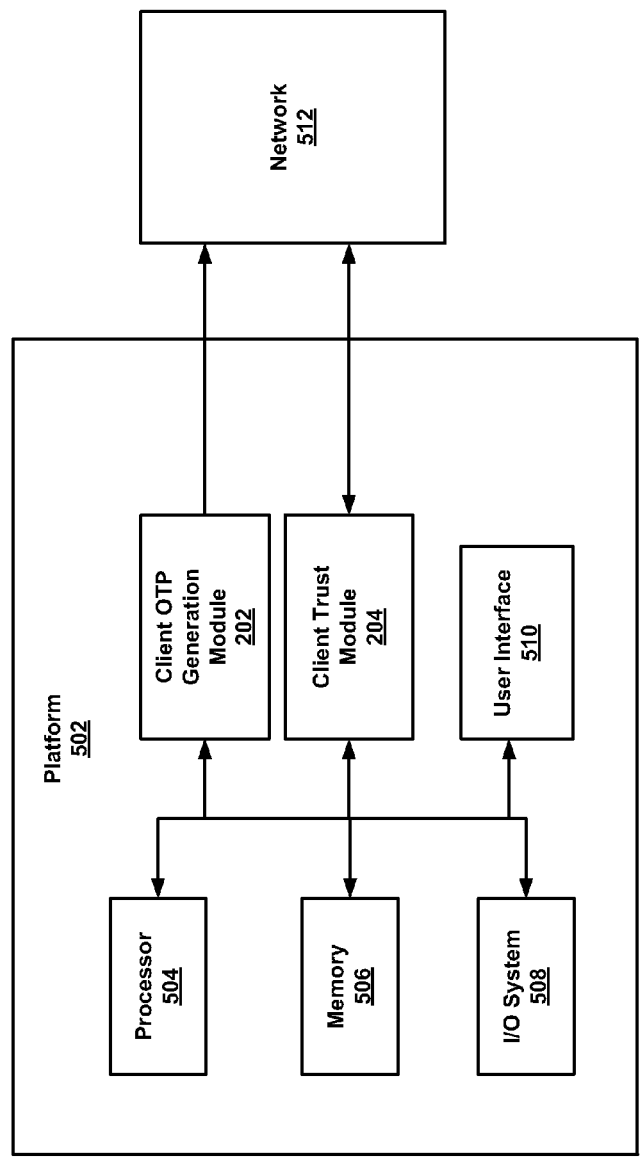
FIG. 5 illustrates a system diagram showing platforms consistent with an exemplary embodiment of the present disclosure.

FIG. 5 illustrates a system diagram 500 showing platforms consistent with an exemplary embodiment of the present disclosure. A platform 502 may be a mobile device, such as, for example, a smartphone, a tablet or a laptop computing device configured to transmit or receive signals over a network. In some embodiments, platform 502 may include a processor 504, memory 506, an input/output (I/O) system 508, a display/keyboard or other type of user interface (UI) 510 such as, for example, a touchscreen. The platform may also include a client OTP generation module 202 and a client trust module 204 as described previously. Any number of platforms 502 may transmit or receive signals through a network, for example wired or wireless network 512 to one or more authentication servers 102 and trust brokers 104.

Figure 6:
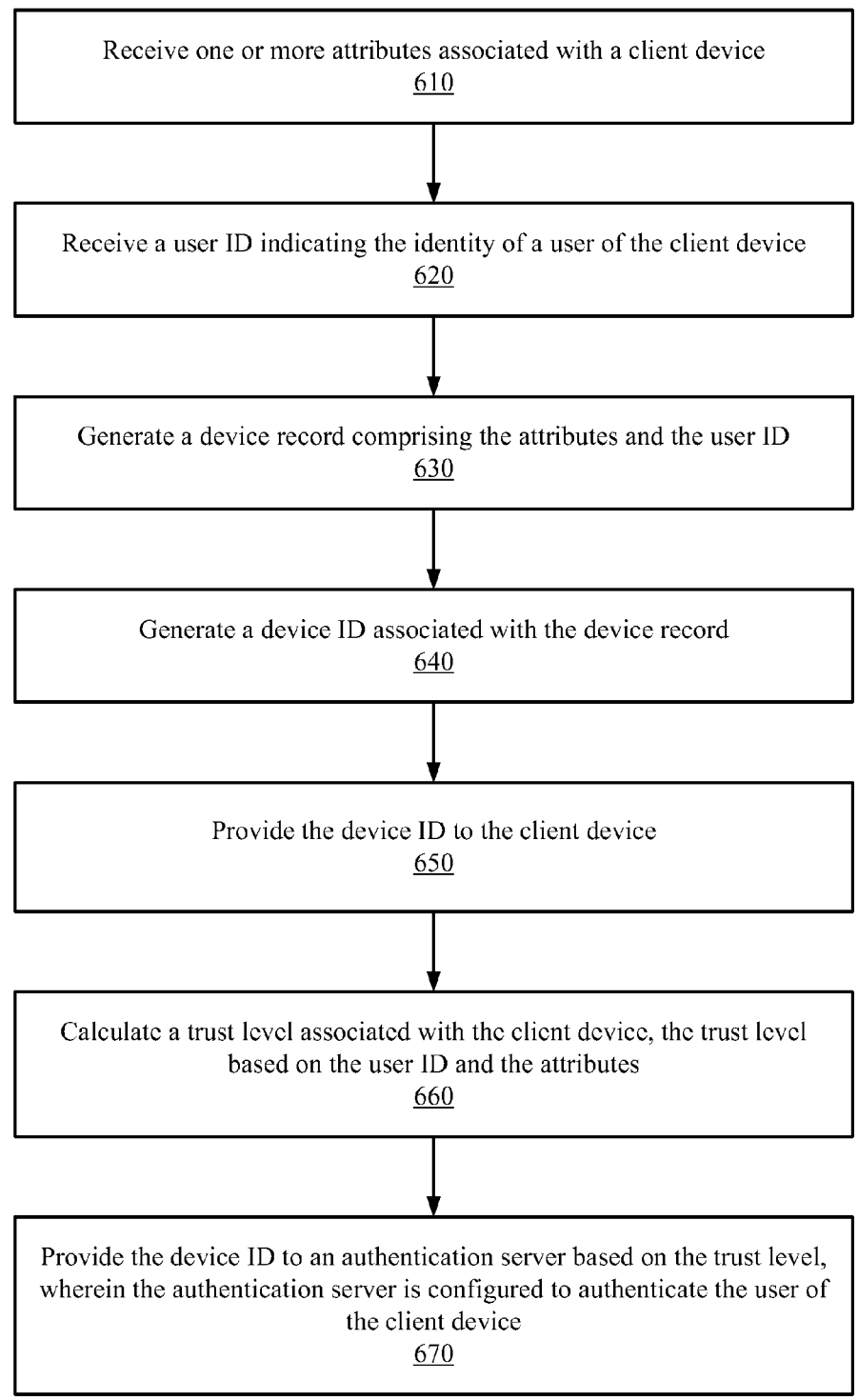
FIG. 6 illustrates a flowchart of operations of another exemplary embodiment consistent with the present disclosure.

FIG. 6 illustrates a flowchart of operations 600 of another exemplary embodiment consistent with the present disclosure. The operations provide a method for secure user authentication with improved OTP verification for a session between a client device and a server. The operations may be performed by a trust broker system in communication with a client device and an authentication server as described previously. At operation 610, one or more attributes associated with a client device are received by the trust broker from the client device. At operation 620, a user ID indicating the identity of a user of the client device is received. At operation 630, a device record comprising the attributes and the user ID is generated. At operation 640, a device ID associated with the device record is generated. At operation 650, the device ID is provided to the client device. At operation 660, a trust level associated with the client device is calculated. The trust level is based on the user ID and the attributes. At operation 670, the device ID is provided to an authentication server based on the trust level. The authentication server is configured to authenticate the user of the client device.

Embodiments of the methods described herein may be implemented in a system that includes one or more storage mediums having stored thereon, individually or in combination, instructions that when executed by one or more processors perform the methods. Here, the processor may include, for example, a system CPU (e.g., core processor) and/or programmable circuitry. Thus, it is intended that operations according to the methods described herein may be distributed across a plurality of physical devices, such as processing structures at several different physical locations. Also, it is intended that the method operations may be performed individually or in a subcombination, as would be understood by one skilled in the art. Thus, not all of the operations of each of the flow charts need to be performed, and the present disclosure expressly intends that all subcombinations of such operations are enabled as would be understood by one of ordinary skill in the art.

The storage medium may include any type of tangible medium, for example, any type of disk including floppy disks, optical disks, compact disk read-only memories (CD-ROMs), compact disk rewritables (CD-RWs), digital versatile disks (DVDs) and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions.

"Circuitry", as used in any embodiment herein, may include, for example, singly or in any combination, hardwired circuitry, programmable circuitry, state machine circuitry, and/or firmware that stores instructions executed by programmable circuitry. An app may be embodied as code or instructions which may be executed on programmable circuitry such as a host processor or other programmable circuitry. A module, as used in any embodiment herein, may be embodied as circuitry. The circuitry may be embodied as an integrated circuit, such as an integrated circuit chip.

Thus, the present disclosure provides systems, devices, methods and computer readable media for secure user authentication with improved OTP verification. The following examples pertain to further embodiments.

The system may include a device attribute collection module configured to receive one or more attributes associated with a client device and further configured to receive a user ID indicating the identity of a user of the client device. The system of this example may also include a device record creation module configured to generate a device record including the attributes and the user ID, and further configured to generate a device ID associated with the device record and to provide the device ID to the client device. The system of this example may further include a trust level calculation module configured to calculate a trust level associated with the client device, the trust level based on the user ID and the attributes The trust level calculation module of this example may further be configured to provide the device ID to an authentication server based on the trust level, and the authentication server is configured to authenticate the user of the client device.

Another example system includes the forgoing components and the attributes include a device serial number, an IMEI, and/or a jailbroken/rooted operating system status.

Another example system includes the forgoing components and the attributes include a location of the device and a timestamp.

Another example system includes the forgoing components and the client device is configured to transmit the device ID, provided by the trust broker system, to the authentication server, and further configured to transmit a PIN and an OTP to the authentication server.

Another example system includes the forgoing components and the authentication server is configured to authenticate the user and the client device based on a match of the device ID provided by the trust broker system to the device ID provided by the client device, and the authentication further based on a verification of a PIN and an OTP provided by the client device.

Another example system includes the forgoing components and further includes an encryption module configured to encrypt communication between the trust broker system and the client device.

Another example system includes the forgoing components and the encrypted communication is relayed through a middleware web server.

According to another aspect there is provided a device for secure user authentication. The device may include an attribute collection module configured to collect attributes associated with the device. The device may also include a client trust module configured to identify a user of the device, associate a user ID with the user and transmit the user ID and the collected attributes to a trust broker system. The client trust module may further be configured to receive a device ID from the trust broker system, the device ID associated with a pairing of the user ID and the attributes. The device may further include a client OTP generation module configured to generate an OTP and further configured to transmit the OTP and the device ID to an authentication server.

Another example device includes the forgoing components and the device is further configured to transmit a PIN to the authentication server, the PIN obtained from the user.

Another example device includes the forgoing components and the device is further configured to transmit a token ID to the authentication server, the token ID associated with the generation of the OTP.

Another example device includes the forgoing components and the attributes include a device serial number, an IMEI, and/or a jailbroken/rooted operating system status.

Another example device includes the forgoing components and the attributes include a location of the device and a timestamp.

Another example device includes the forgoing components and the authentication server is configured to authenticate the user and the device based on a match of the device ID provided by the trust broker system to the device ID provided by the device, and the authentication further based on a verification of a PIN and the OTP provided by the device.

Another example device includes the forgoing components and further includes an encryption module configured to encrypt communication between the device and the trust broker system and between the device and the authentication server.

Another example device includes the forgoing components and the encrypted communication is relayed through a middleware web server.

According to another aspect there is provided a method. The method may include receiving one or more attributes associated with a client device. The method of this example may also include receiving a user ID indicating the identity of a user of the client device. The method of this example may further include generating a device record including the attributes and the user ID. The method of this example may further include generating a device ID associated with the device record. The method of this example may further include providing the device ID to the client device. The method of this example may further include calculating a trust level associated with the client device, the trust level based on the user ID and the attributes. The method of this example may further include providing the device ID to an authentication server based on the trust level, and the authentication server is configured to authenticate the user of the client device.

Another example method includes the forgoing operations and the attributes include a device serial number, an IMEI, and/or a jailbroken/rooted operating system status.

Another example method includes the forgoing operations and the attributes include a location of the device and a timestamp.

Another example method includes the forgoing operations and further includes encrypting communications with the client device.

According to another aspect there is provided a method. The method may include collecting attributes associated with a device. The method of this example may also include identifying a user of the device. The method of this example may further include associating a user ID with the user. The method of this example may further include transmitting the user ID and the collected attributes to a trust broker system. The method of this example may further include receiving a device ID from the trust broker system, the device ID associated with a pairing of the user ID and the attributes. The method of this example may further include generating an OTP. The method of this example may further include transmitting the OTP and the device ID to an authentication server.

Another example method includes the forgoing operations and further includes obtaining a PIN from the user and transmitting the PIN to the authentication server.

Another example method includes the forgoing operations and further includes transmitting a token ID to the authentication server, the token ID associated with the generation of the OTP.

Another example method includes the forgoing operations and the attributes include a device serial number, an IMEI, and/or a jailbroken/rooted operating system status.

Another example method includes the forgoing operations and the attributes include a location of the device and a timestamp.

Another example method includes the forgoing operations and further includes encrypting communication between the device and the trust broker system and between the device and the authentication server.

Another example method includes the forgoing operations and further includes relaying the encrypted communication through a middleware web server.

According to another aspect there is provided a system. The system may include a means for receiving one or more attributes associated with a client device. The system of this example may also include a means for receiving a user ID indicating the identity of a user of the client device. The system of this example may further include a means for generating a device record including the attributes and the user ID. The system of this example may further include a means for generating a device ID associated with the device record. The system of this example may further include a means for providing the device ID to the client device. The system of this example may further include a means for calculating a trust level associated with the client device, the trust level based on the user ID and the attributes. The system of this example may further include a means for providing the device ID to an authentication server based on the trust level, and the authentication server is configured to authenticate the user of the client device.

Another example system includes the forgoing components and the attributes include a device serial number, an IMEI, and/or a jailbroken/rooted operating system status.

Another example system includes the forgoing components and the attributes include a location of the device and a timestamp.

Another example system includes the forgoing components and further includes a means for encrypting communications with the client device.

According to another aspect there is provided a system. The system may include a means for collecting attributes associated with a device. The system of this example may also include a means for identifying a user of the device. The system of this example may further include a means for associating a user ID with the user. The system of this example may further include a means for transmitting the user ID and the collected attributes to a trust broker system. The system of this example may further include a means for receiving a device ID from the trust broker system, the device ID associated with a pairing of the user ID and the attributes. The system of this example may further include a means for generating an OTP. The system of this example may further include a means for transmitting the OTP and the device ID to an authentication server.

Another example system includes the forgoing components and further includes a means for obtaining a PIN from the user and transmitting the PIN to the authentication server.

Another example system includes the forgoing components and further includes a means for transmitting a token ID to the authentication server, the token ID associated with the generation of the OTP.

Another example system includes the forgoing components and the attributes include a device serial number, an IMEI, and/or a jailbroken/rooted operating system status.

Another example system includes the forgoing components and the attributes include a location of the device and a timestamp.

Another example system includes the forgoing components and further includes a means for encrypting communication between the device and the trust broker system and between the device and the authentication server.

Another example system includes the forgoing components and further includes a means for relaying the encrypted communication through a middleware web server.

According to another aspect there is provided at least one computer-readable storage medium having instructions stored thereon which when executed by a processor, cause the processor to perform the operations of the method as described in any of the examples above.

According to another aspect there is provided an apparatus including means to perform a method as described in any of the examples above.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. A method for secure user authentication, said method comprising:
   receiving one or more attributes associated with a client device and further configured to receive a user identification (ID) indicating the identity of a user of said client device;
   generating a device record comprising a pairing of said one or more attributes and said user ID;
   generating a device ID uniquely referencing said device record;
   transmitting said device ID to said client device;
   calculating a trust level associated with said client device, said trust level based on said user ID and said one or more attributes; and
   transmitting said device ID to an authentication server based on said trust level, wherein said authentication server is configured to authenticate said user of said client device.

2. The method of claim 1, wherein said one or more attributes comprise a device serial number, an international mobile equipment identification (IMEI), or a jailbroken/rooted operating system status.

3. The method of claim 1, wherein said one or more attributes comprise a location of said client device and a timestamp.

4. The method of claim 1, further comprising transmitting said device ID, provided by a trust broker system, to said authentication server;
   transmitting a Personal Identification Number (PIN) and a One-Time-Passcode (OTP) to said authentication server.

5. The method of claim 1, further comprising authenticating, at said authentication server, said user and said client device based on a match of said device ID provided by a trust broker system to said device ID provided by said client device, and said authentication further based on a verification of a PIN and an OTP provided by said client device.

6. The method of claim 1, wherein said device ID is encrypted after generation prior to transmission to said client device.

7. The method of claim 6, wherein said transmitting said encrypted device ID comprises relaying said encrypted device ID through a middleware web server to said client device.

8. A method for secure user authentication, said method comprising:
   collecting attributes associated with a device;
   identifying a user of said device;
   associating a user identification (ID) with said user and transmitting said user ID and said collected attributes to a trust broker system;
   receiving a device ID from said trust broker system, said device ID associated with a pairing of said user ID and said attributes; and
   generating an OTP and further configured to transmit said OTP and said device ID to an authentication server.

9. The method of claim 8, further comprising transmitting a PIN to said authentication server, said PIN obtained from said user.

10. The method of claim 8, further comprising transmitting a token ID to said authentication server, said token ID associated with said generation of said OTP.

11. The method of claim 8, wherein said attributes comprise a device serial number, an international mobile equipment identification (IMEI), or a jailbroken/rooted operating system status.

12. The method of claim 8, wherein said attributes comprise a location of said device and a timestamp.

13. The method of claim 8, further comprising authenticating said user and said device based on a match of said device ID provided by said trust broker system to said device ID provided by said device, and said authentication further based on a verification of a PIN and said OTP provided by said device.

14. The method of claim 8, further comprising encrypting communication between said device and said trust broker system and between said device and said authentication server.

15. The method of claim 14, wherein said encrypted communication is relayed through a middleware web server.

16. A non-transitory computer-readable storage medium having instructions stored thereon which when executed by a processor result in the following operations for secure user authentication, said operations comprising:
   receiving one or more attributes associated with a client device;
   receiving a user identification (ID) indicating the identity of a user of said client device;
   generating a device record comprising a pairing of said one or more attributes and said user ID;
   generating a device ID uniquely referencing said device record;
   causing said device ID to be transmitted to said client device;
   calculating a trust level associated with said client device, said trust level based on said user ID and said one or more attributes; and
   causing said device ID to be transmitted to an authentication server based on said trust level, wherein said authentication server is configured to authenticate said user of said client device.

17. The non-transitory computer-readable storage medium of claim 16, wherein said one or more attributes comprise a device serial number, an international mobile equipment identification (IMEI), or a jailbroken/rooted operating system status.

18. The non-transitory computer-readable storage medium of claim 16, wherein said one or more attributes comprise a location of said client device and a timestamp.

19. The non-transitory computer-readable storage medium of claim 16, further comprising the operation of encrypting communications with said client device.

20. A non-transitory computer-readable storage medium having instructions stored thereon which when executed by a processor result in the following operations for secure user authentication, said operations comprising:
   collecting attributes associated with a device;
   identifying a user of said device;
   associating a user identification (ID) with said user;
   causing said user ID and said attributes to be transmitted to a trust broker system;

receiving a device ID from said trust broker system, said device ID associated with a pairing of said user ID and said attributes;

generating an One-Time-Passcode (OTP); and causing said OTP and said device ID to be transmitted to an authentication server.

21. The non-transitory computer-readable storage medium of claim 20, further comprising the operations of obtaining a PIN from said user and transmitting said PIN to said authentication server.

22. The non-transitory computer-readable storage medium of claim 20, further comprising the operation of causing a token ID to be transmitted to said authentication server, said token ID associated with said generation of said OTP.

23. The non-transitory computer-readable storage medium of claim 20, wherein said attributes comprise a device serial number, an international mobile equipment identification (IMEI), or a jailbroken/rooted operating system status.

24. The non-transitory computer-readable storage medium of claim 20, wherein said attributes comprise a location of said client device and a timestamp.

25. The non-transitory computer-readable storage medium of claim 20, further comprising the operation of encrypting communication between said client device and said trust broker system and between said device and said authentication server.

26. The non-transitory computer-readable storage medium of claim 25, further comprising causing said encrypted communication to be relayed through a middleware web server.

\* \* \* \* \*